US011476692B2

(12) United States Patent
Baby et al.

(10) Patent No.: US 11,476,692 B2
(45) Date of Patent: Oct. 18, 2022

(54) TURBO SUPPORT FOR SYSTEMS WITH LIMITED BATTERY POWER

(71) Applicant: INTEL CORPORATION, Santa Clara, CA (US)

(72) Inventors: Anil Baby, Bangalore (IN); Alexander B. Uan-Zo-li, Hillsboro, OR (US); Chee Lim Nge, Hillsboro, OR (US); N V S Kumar Srighakollapu, Bengaluru (IN)

(73) Assignee: INTEL CORPORATION, Santa Clara, CA (US)

(*) Notice: Subject to any disclaimer, the term of this patent is extended or adjusted under 35 U.S.C. 154(b) by 147 days.

(21) Appl. No.: 16/831,933

(22) Filed: Mar. 27, 2020

(65) Prior Publication Data

US 2021/0305814 A1 Sep. 30, 2021

(51) Int. Cl.
*H02J 7/00* (2006.01)
*H02J 7/34* (2006.01)
*G06F 1/3218* (2019.01)
*G06F 1/30* (2006.01)

(52) U.S. Cl.
CPC ............ *H02J 7/007* (2013.01); *G06F 1/3218* (2013.01); *H02J 7/0063* (2013.01); *H02J 7/345* (2013.01); *G06F 1/30* (2013.01)

(58) Field of Classification Search
CPC .......... H02J 7/007; H02J 7/0063; H02J 7/345; G06F 1/3218; G06F 1/30
USPC .......................... 320/116, 122, 140, 163, 166
See application file for complete search history.

(56) References Cited

U.S. PATENT DOCUMENTS

| | | | |
|---|---|---|---|
| 10,201,050 B2* | 2/2019 | Wang | H05B 45/00 |
| 2001/0043113 A1* | 11/2001 | Hoshino | H04B 10/564 |
| | | | 327/534 |
| 2006/0198169 A1* | 9/2006 | Tsai | H02M 3/158 |
| | | | 363/34 |
| 2009/0033293 A1* | 2/2009 | Xing | H02J 7/02 |
| | | | 323/284 |
| 2018/0278053 A1* | 9/2018 | Uan-Zo-li | G01R 19/16542 |
| 2020/0247253 A1* | 8/2020 | Furukawa | B60L 50/11 |

* cited by examiner

*Primary Examiner* — Edward Tso
*Assistant Examiner* — Aaron Piggush
(74) *Attorney, Agent, or Firm* — Schwabe, Williamson & Wyatt, P.C.

(57) ABSTRACT

In some examples, an apparatus includes a battery and a dynamic voltage source coupled in series with the battery. The dynamic voltage source is to maintain (or clamp) a system voltage from going below a minimum system voltage.

13 Claims, 6 Drawing Sheets

500

TURBO SUPPORT FOR SYSTEMS WITH LIMITED BATTERY POWER

TECHNICAL FIELD

This disclosure relates generally to turbo support for systems with limited battery power.

BACKGROUND

Computing processor cores may be used in a turbo mode. In a turbo mode, for example, the processor core may be run faster than a marked frequency while working within power, temperature, and specification limits of a thermal design power (TDP). This can result in increased performance. Intel processors, for example, may use a turbo boost technology to match platform power delivery and package thermal solutions using power control settings. These settings may include one or more of Power Limit 1 (PL1), Power Limit 2 (PL2), Power Limit 3 (PL3), Power Limit 4 (PL4), and a turbo time parameter (Tau). Power Limit 4 (PL4), for example, may be a power limit that will not be exceeded. PL4 power limiting may be used to preemptively limit frequency to prevent spikes above the power limit (above PL4).

Compact computing devices may face a challenge of meeting system power requirements during a turbo or PL4 event to process a task with a best performance and user experience. If system power is not controlled during such an event, an abrupt shutdown of the system may occur. This may be more likely to happen, for example, if a state of charge of the battery is low. Total system power may be limited to the capabilities of the battery, but this can limit system performance.

BRIEF DESCRIPTION OF THE DRAWINGS

The following detailed description may be better understood by referencing the accompanying drawings, which contain specific examples of numerous features of the disclosed subject matter.

In some cases, the same numbers are used throughout the disclosure and the figures to reference like components and features. In some cases, numbers in the 100 series refer to features originally found in FIG. 1; numbers in the 200 series refer to features originally found in FIG. 2; and so on.

DETAILED DESCRIPTION

Figure 1:
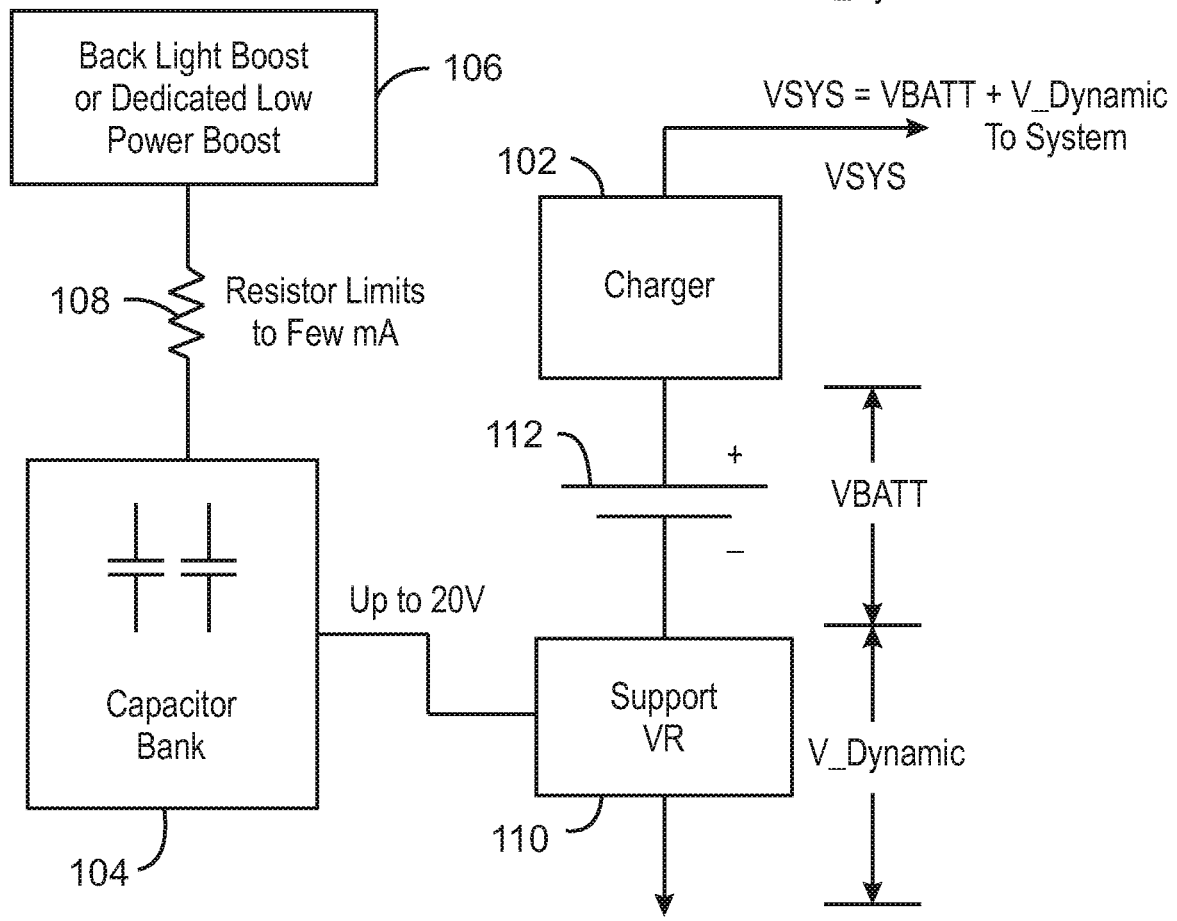
FIG. 1 illustrates a dynamic voltage source in series with a battery to clamp a system voltage from going below a minimum system voltage in accordance with some embodiments.

In some systems, the peak power that may be drawn from a battery can be limited, and can continue to reduce as the battery discharges. In this situation, if the battery continues to need to provide peak power to the system, the battery can go to a very low level, and the system may go into a shutdown stage where the voltage from the battery is no longer used by the system and as a result most or all of the devices in the system stop functioning. This can be particularly true in systems with single cell (or 1S) batteries.

In some embodiments, a shutdown may be avoided while maintaining good performance of the system while a state of charge of the battery is low. Energy may be stored in capacitors, and that stored energy may be used to provide another source of power to the system. This power may be used for a short time to provide power to the system (for example, during a turbo mode of operation).

Compact computing devices may face a challenge of meeting system power requirements during a turbo processing event or Power Limit 4 (PL4) processing event in order to process a task with a best performance and user experience. If system power is not controlled during a turbo event or PL4 event, an abrupt shutdown of the system may occur. This may be more likely to happen if a state of charge of the battery is low. Total system power may be limited to the capabilities of the battery, but this can limit system performance.

PL4 and/or turbo events are often very short and may only last, for example, a few hundred microseconds (a few 100 µs) to a few milliseconds (a few ms). An average power requirement for PL4 support can be low, while a peak power requirement can be high. Therefore, in accordance with some embodiments, turbo power support (and/or PL4 power support) may be implemented for short durations, and system performance may be prevented from dropping (for example, while a state of charge of the battery is low or for designs that have battery power limitations).

One option to address the problem of meeting system power requirements during a turbo or PL4 event can be to use energy stored in system capacitors during the event. Battery power limitation may be continuously calculated, and the processor (or system on chip or SoC) may be allowed to draw a higher power until the system capacitor discharges to a threshold point. A system capacitor can be used to provide the additional power during this time. A hardware input (for example, a PROCHOT # input) to the processor (or SoC) may be asserted to reduce the processor (or SoC) power. In this manner, the system voltage may be prevented from falling below a minimum level that power delivery circuits can tolerate (and/or a minimum voltage that the system can tolerate). However, a low amount of energy may be available from system capacitors due to a small discharge voltage (for example, delta voltage is around 1 volt), and peak power support may only be available for a short duration (for example, for a couple of tens of microseconds). Additionally, complex computation may be necessary to estimate a threshold voltage at which the hardware input signal (for example, a PROCHOT # input signal) is asserted. Further, system capacitance may continue to discharge after the input signal assertion (for example, after PROCHOT # assertion) due to a delay (for example, due to a delay of around 20 µs). It is also noted that system capacitance value, minimum system voltage (for example, a minimum voltage that the system can tolerate), system power during turbo, available power from the battery, and other variables may affect calculation of such an estimated threshold value at which the input signal is asserted.

A system may use a bi-directional buck boost battery charger to implement peak power support. During normal operation when no charger adapter is plugged into the system, the buck boost charger can maintain voltage of input decoupling capacitors at a certain voltage level (for example, at a level of around 20 volts), taking energy from the battery (for example, the buck boost battery charger can allow bidirectional energy flow). When the system encounters a turbo (or PL4) event, system capacitors can discharge to a minimum system voltage and, at this point, the charger can pump all energy stored in the input capacitors to the system voltage rails to hold the system voltage above or at the minimum system voltage, for example. Once the charger input capacitors are exhausted, the processor power (and/or the SoC power) can be reduced (for example, by asserting a processor input signal such as a PROCHOT # signal). In such a system, a complex handshake may be necessary between the charger, a type-C power delivery (PD) controller, and an embedded controller (EC). For example, when a type-C adapter is plugged in, the charger may need to quickly discharge its input capacitors prior to connecting to a type-c VBUS. This may need to be initiated by the power delivery (PD) controller and the embedded controller (EC) may need to change a mode of the charger. Once the input capacitors are discharged, the PD controller may need to be informed in order to connect the VBUS to the charger. During this time, PL4 support may not be available. Additionally, the input signal (PROCHOT #) may need to be asserted during any plug or unplug event on type-C ports. Costly charger solutions may be required, and complex firmware/software solutions may be necessary. Further, if a lower power charger (for example, a 5V, 1.5 A charger) is plugged into the device, the feature may need to be disabled, since the charger VIN may not allow capacitors charge to 20 volts. Such disadvantageous situations may be avoided in accordance with some embodiments (for example, in some embodiments as illustrated and/or described herein, such as illustrated in FIG. 1 and/or described in reference thereto).

FIG. 1 illustrates a block diagram 100 (for example, such as a circuit 100 or a system 100) of a dynamic voltage source in series with a battery to clamp a system voltage (VSYS) from going below a minimum system voltage (or clamp voltage) (VCLAMP) such as a minimum voltage that the system can tolerate. Block diagram 100 may include, for example, a charger 102 (for example, a battery charger), a capacitor bank 104 including any number of capacitors (for example, one or more capacitors) which may be used to support peak power, a regulator 106 (for example, a back light boost or a dedicated low power boost voltage regulator), a resistor 108 (for example, a resistor to limit to a few mA during a turbo and/or PL4 event), a support voltage regulator (support VR) 110, and a battery 112. In accordance with some embodiments, circuit and/or system 100 can implement turbo power support for short durations, and prevent system performance from dropping while the state of charge of the battery 112 is low, and/or can be used in implementations with battery peak power limitations, for example.

The support voltage regulator (VR) 110 of FIG. 1 can be, for example, a buck converter taking an input supply from the capacitor bank 104. One or more capacitor of the capacitor bank 104 can be charged to a variety of voltages depending upon the implementation (for example, up to 20 volts or more in some embodiments). Regulator 106 may be used to source the voltage to the capacitor bank 104. In some embodiments, regulator 106 may be a dedicated voltage source. However, in some embodiments, the regulator 106 that sources this voltage can be a back light boost converter output (for example, in the 20v output voltage range) to minimize cost, area, and idle power consumption. This voltage may also be sourced by regulator 106 from a very lower power boost converter (for example, occupying a small board area). In some embodiments, for example, back light boost converters may be used that allow light emitting diode (LED) strings to be turned off without turning off the back light boost. This can be used, for example, in implementations where turbo support is needed when the display screen is off. In some embodiments, back light boost may be turned off in sleep or standby modes, for example.

As illustrated in FIG. 1, in some embodiments, if the system voltage (VSYS) is greater than the minimum system voltage (or clamp voltage such as VLCAMP voltage), the system voltage (VSYS) is equal to the battery voltage (VBATT). If the system voltage (VSYS) is less than the minimum system voltage (or clamp voltage such as VLCAMP voltage), the system voltage (VSYS) is equal to the battery voltage (VBATT) plus the dynamic voltage (V_Dynamic), which may be maintained at a level equal to the minimum system voltage (or VCLAMP voltage), or may be maintained at a level above the minimum system voltage (or VCLAMP voltage). That is, a dynamic voltage source such as support voltage regulator 110 may be coupled in series with the battery 112, where the dynamic voltage source maintains (or clamps) a system voltage (such as VSYS) from going below a minimum system voltage (such as VCLAMP).

In some embodiments, when a PL4 and/or turbo event occurs, battery voltage (VBATT) may start to drop. When the system voltage (VSYS) reaches the clamp voltage (VCLAMP), the support VR 110 output may increase in order to keep the total voltage above the minimum system voltage using the energy from the input capacitors (for example, from one or more capacitors from the capacitor bank 104). In accordance with some embodiments, depending on the size of the capacitor bank 104, support power can be made available for the duration of the turbo event (and/or PL4 event).

The support VR 110 of FIG. 1 may provide a relatively smaller portion of total output power as compared with other solutions. Remaining power can be provided from the battery 112. For example, in some embodiments, the voltage (VBATT) of battery 112 is allowed to dip below the minimum system voltage and/or clamp voltage (VCLAMP). The battery voltage (VBATT) may be lower by the same voltage as that of the support VR 110 voltage (V_Dynamic). As a result, the battery 112 is able to deliver much more power, since it can reduce beyond the clamp voltage (VCLAMP) and is not limited to drop only to the clamp voltage. This can allow longer turbo times for the same capacitance of the capacitor bank 104. In some embodiments, for example, the turbo time may increase significantly (for example, a 64% increased turbo time in accordance with some embodiments). In some embodiments, however, a same turbo time may be allowed with a reduced capacitance of the capacitor bank 104 (for example, with a 50% reduction in capacitance in accordance with some embodiments).

In some embodiments, a wide variety of step down controllers may be used. In some embodiments, any combination of use of chargers, embedded controllers, and/or power delivery controllers may be used. In some embodiments, a minimum overhead on firmware/software may occur.

Figure 2:
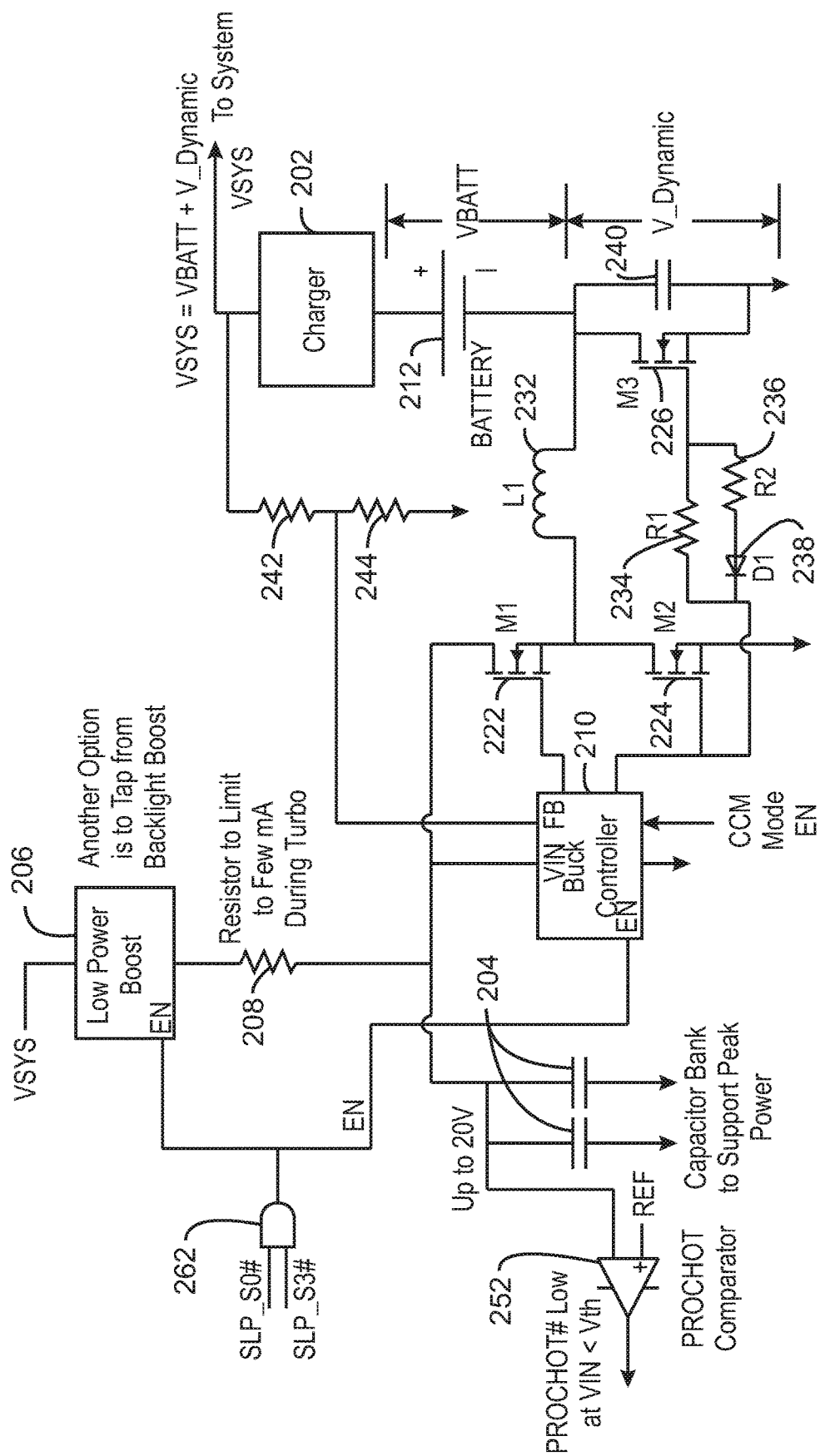
FIG. 2 illustrates a system in accordance with some embodiments.

FIG. 2 illustrates a circuit 200 and/or system 200 to provide turbo power support in accordance with some embodiments. In some embodiments, elements of circuit 200 and/or system 200 may operate similarly or the same as elements of the circuit and/or system 100 illustrated in FIG. 1. In some embodiments, circuit 200 and/or system 200 may include, for example, a charger 202 (for example, a battery charger), a capacitor bank 204 including any number of capacitors (for example, one or more capacitors) which may be used to support peak power, a regulator 206 (for example, a backlight boost, a tap from a backlight boost or a dedicated low power boost), a resistor 208 (for example, a resistor to limit to a few mA during a turbo and/or PL4 event), a support voltage regulator (support VR) 210 (for example, such as a buck controller, a time controller, and/or a constant ON time controller), a battery 212, a transistor M1 222 (for example, a field effect transistor), a transistor M2 224 (for example, a field effect transistor), a transistor M3 226 (for example, a field effect transistor), an inductor L1 232, a resistor R1 234, a resistor R2 236, a diode D1 238, a capacitor 240, a resistor 242, a resistor 244, a comparator 252, and an AND gate 262. In accordance with some embodiments, circuit 200 can implement turbo power support for short durations, and prevent system performance from dropping while the state of charge of the battery 212 is low, and/or can be used in implementations with battery peak power limitations, for example.

In some embodiments, support VR 210, transistors 222, 224, and 226, inductor 232, resistors 234 and 236, diode 238, and/or capacitor 240 may be used with capacitor bank 204 to provide a dynamic voltage source coupled in series with the battery 212. In some embodiments, resistors 242 and 244 are used to sense the system voltage (VSYS) provided to the system. In some embodiments, transistor M3 226 (for example, a field effect transistor or FET) may be used to bypass the support voltage regulator (VR) 210 if VSYS is sensed as being greater than a minimum system voltage (and/or greater than VLCLAMP). In some embodiments, transistor M3 226 may be a low RDSon FET (for example, a low drain-source on resistance FET). When it is sensed (for example, by resistors 242 and 244) that the system voltage falls to the minimum system voltage (or clamp voltage) level, the bypass transistor M3 226 may be turned off and the support VR 210 output voltage may be allowed to ramp. In accordance with some embodiments, this may be implemented using a step down controller, for example. In some embodiments, VR 210 is a device such as a buck controller, a step down controller, an ON time controller, a constant ON time controller, and/or any type of controller that can provide very fast operation in order to clamp the voltage quickly once the system voltage is sensed as reaching and/or falling below the minimum system voltage (or clamp voltage).

The support voltage regulator (VR) 210 of FIG. 2 can be, for example, a buck converter taking an input supply from the capacitor bank 204. One or more capacitor of the capacitor bank 204 can be charged to a variety of voltages depending upon the implementation (for example, up to 20 volts or more in some embodiments). Regulator 206 may be used to source the voltage to the capacitor bank 204. In some embodiments, regulator 206 may be a dedicated voltage source. However, in some embodiments, the regulator 206 that sources this voltage can be a back light boost converter output (for example, in the 20v output voltage range) to minimize cost, area, and idle power consumption. This voltage may also be sourced by regulator 206 from a very lower power boost converter (for example, occupying a small board area). In some embodiments, for example, back light boost converters may be used that allow light emitting diode (LED) strings to be turned off without turning off the back light boost. This can be used, for example, in implementations where turbo support is needed when the display screen is off. In some embodiments, back light boost may be turned off in sleep or standby modes, for example.

In some embodiments, support VR 210 functionality may be used (or enabled) when the display is on, for example. Support VR 210 voltage input (VIN) may be provided from a back light boost converter output such as regulator 206, for example. Various voltages may be provided to get optimal use of the capacitor bank 204 (for example, in some embodiments, a voltage in the 20 volt range may be used). In some embodiments, a 5 volt system VR may be used, and the buck controller 210 may take a 5 volt bias supply input. This can help reduce extra power consumption.

In some embodiments, a system VR inductor (for example, inductor L1 232) and a power stage may be used to take peak system current (for example, for a short duration). In some embodiments, transistor M1 222, transistor M2 224, and inductor L1 232 may be optimally sized to provide peak power support for a short duration. In some embodiments, high saturation flux materials may be used (for example, with increased magnetic losses) to reduce the inductor L1 232 size (for example, since efficiency may not be critical).

In some embodiments, an input power supply voltage of the controller (for example, a bias 5 volt input power supply voltage of the controller, and/or VIN of the buck controller 210) may be connected to a 5 volt S0 system voltage regulator (for example, to a 5V_S0 system VR). In some embodiments, the 5V_S0 system VR needs to be on in an S0 system state. In some embodiments, the input power supply voltage of the controller 210 may be power gated with a first standby or sleep state SLP_S0 # or a second standby or sleep state SLP_S3 # signal to reduce system power during a system standby mode, or sleep mode (for example, using AND gate 262).

In some embodiments, a step down controller such as a constant ON time controller may be used to obtain a very quick inductor 232 current build up when the system voltage (VSYS) falls below the clamp voltage (VCLAMP).

In some embodiments, a step down controller may be configured to a continuous conduction mode (CCM), for example, using a CCM mode enable (EN) signal to controller 210 as illustrated in FIG. 2. This may help to ensure that both transistor M2 224 and/or transistor M3 226 are ON (or specifically to ensure that transistor M3 226 is ON) in a normal mode to provide a bypass for the support VR 210. A selected step down controller may be used that does not have an over voltage protection feature. If an over voltage protection feature is included, a latched off state may be triggered.

In some embodiments, voltage regulator (VR) step down/buck controller feedback is taken from a combined system voltage (VSYS). This may be implemented using resistors 242 and 244, for example.

In some embodiments, when the system is powered ON, the step down controller (for example, controller 210) may see a higher voltage than a set voltage, and a soft start is completed.

In some embodiments, when the system voltage (VSYS) falls below a clamp voltage (VCLAMP), the controller 210 can increase the inductor current to increase/regulate the output voltage so that VSYS equals VCLAMP. A delay of, for example, 1 to 2 microseconds (1-2 µs) may occur for the inductor current to increase to this level. In some embodiments, the value of resistor R2 236 is configured so that transistor M3 226 remains ON during this time to provide a path for the system current. As the voltage across transistor M3 226 remains near 0 volts (0V), a small amount of power is consumed from the input capacitors of the capacitor bank 204 (even if there is a short at the output). In some embodiments, a dedicated driver may be used to drive transistor M3 226 to make the timings more accurate.

In some embodiments, the dynamic voltage (V_Dynamic) ramps to clamp the system voltage (VSYS) for turbo support. Peak system current may still be supported by the battery 212 in series with the support voltage regulator (VR) 210.

In some embodiments, once the capacitor voltage (VIN) provided to the support voltage regulator (VR) 212 falls below a threshold voltage (such as a predefined threshold voltage), a comparator 252 (for example, a PROCHOT comparator as illustrated in FIG. 2) compares the voltage from the capacitor bank 204 with a reference voltage REF, and asserts a PROCHOT signal that may be used to reduce processor power consumption (for example, to reduce SoC power) when the energy power source of the capacitor bank 204 is reduced below the voltage reference level (REF).

In some embodiments, system current is reduced and the system voltage (VSYS) recovers above the clamp voltage (VCLAMP).

In some embodiments, a voltage regulator such as a step down/support voltage regulator (VR) controller (for example, controller 210) turns ON the bottom side transistor M2 224 continuously using continuous conduction mode (CCM) operation of the VR controller 210.

In some embodiments, resistor R1 234 is configured so that transistor M3 226 turns ON only after a time equal to greater than two (>2) switching cycles of the step down controller. This can ensure that transistor M3 226 is never turned ON when the support VR 210 is active for clamping the system voltage (VSYS). In some embodiments, transistor M3 226 turns ON only when transistor M2 224 is continuously on for a time greater than two (>2) switching cycles.

In some embodiments, after a few tens of microseconds, transistor M3 226 is turned ON to bypass the system current. During the transition time between V_Dynamic VR 210 to turn ON transistor M3 226, there can be a small duration in which the system current is supported by transistor M2 224 and inductor L1 232.

In some embodiments, the VIN capacitors of the capacitor bank 204 providing voltage to the support VR 210 are charged back (for example, are charged back to approximately 20 volts).

In some embodiments, after the capacitors in the capacitor bank 204 are charged back, the system 200 is then ready for another turbo event.

In some embodiments, I2C communication to the battery 212 and/or to a fuel gauge will see a ground (GND) offset voltage that is the same as the support VR 210 if there is a communication to the fuel gauge during power limit 4 (PL4). Although this may be unlikely, in some embodiments, a mechanism may be implemented to repeat the communication, and by the time of the second attempt, the PL4 event may be over.

In some embodiments, a dedicated driver may be used for transistor M3 226 if a new step down controller is enabled with this feature. Using an extra pin, transistor M3 226 ON/OFF may be controlled more predictably over temperature and manufacturing corners.

Figure 3:
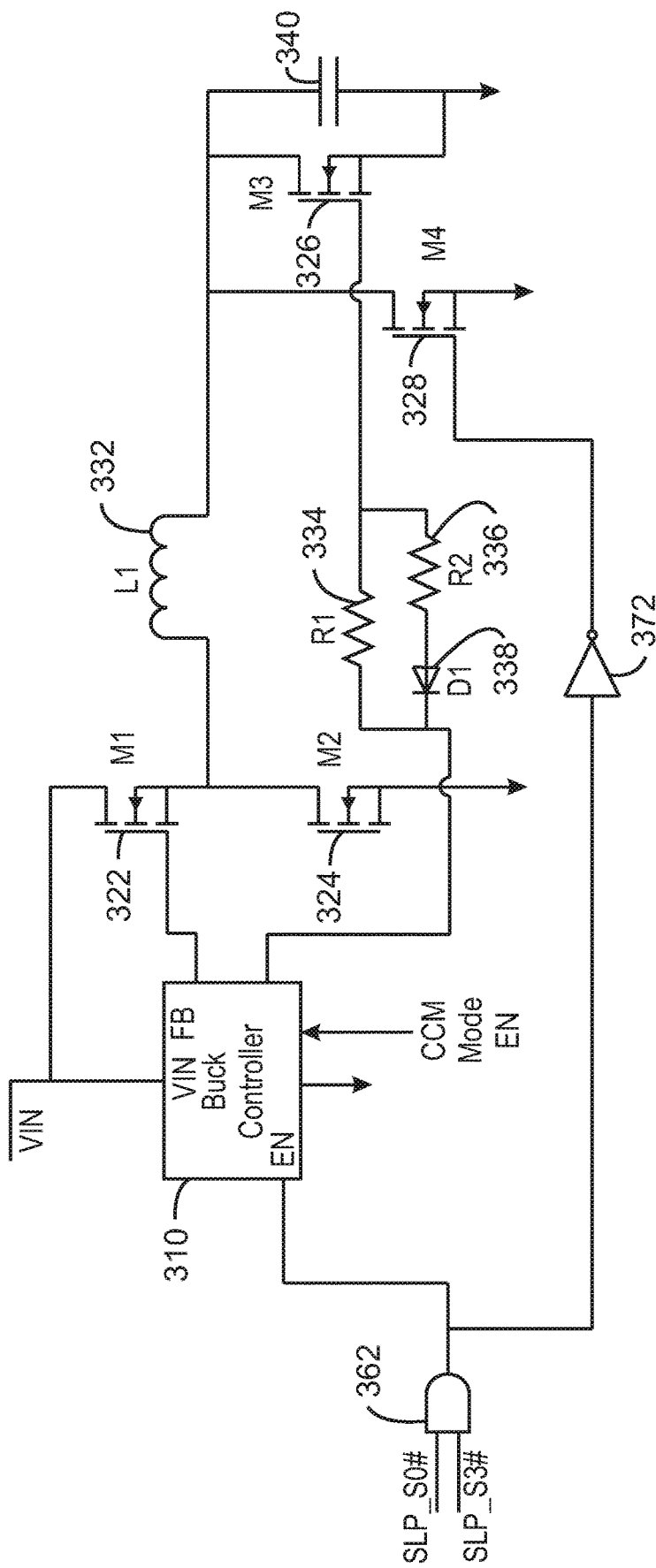
FIG. 3 illustrates a system in accordance with some embodiments.

FIG. 3 illustrates a circuit 300 and/or system 300 that may implement a system current path when the buck controller is turned off in a sleep mode and/or in a system standby mode. In some embodiments, elements of circuit and/or system 300 may operate similarly or the same as elements of the circuit and/or system 100 illustrated in FIG. 1 and/or of the circuit and/or system 200 illustrated in FIG. 2. In some embodiments, in addition to the elements illustrated in FIG. 3, circuit 300 and/or system 300 may include, for example, a charger (for example, a battery charger), a capacitor bank including any number of capacitors (for example, one or more capacitors) which may be used to support peak power, a regulator (for example, a backlight boost, a tap from a backlight boost or a dedicated low power boost), a resistor (for example, a resistor to limit to a few mA during a turbo and/or PL4 event), other resistors, a comparator, and a battery, for example. In some embodiments, circuit 300 and/or system 300 may include a support voltage regulator (support VR) 310 (such as, for example, a buck controller), a transistor M1 322 (for example, a field effect transistor), a transistor M2 324 (for example, a field effect transistor), a transistor M3 326 (for example, a field effect transistor), a transistor M4 328 (for example, a field effect transistor), an inductor L1 332, a resistor R1 334, a resistor R2 336, a diode D1 338, a capacitor 340, an AND gate 362, and an inverter 372. In accordance with some embodiments, circuit and/or system 300 can implement turbo power support for short durations, and prevent system performance from dropping while the state of charge of the battery is low, and/or can be used in implementations with battery peak power limitations, for example.

In some embodiments, transistor M2 324 and transistor M3 326 (for example, FETs 324 and 326) may be turned off in a System S3 sleep mode (indicated by signal SLP_S3 #, for example) or in a System Standby mode (indicated by signal SLP_S0 # being, for example, equal to 0).

In some embodiments, circuit and/or system 300 illustrates a circuit and/or system having a system standby mode and/or system sleep mode system current path. In some embodiments, transistor M3 326 in FIG. 3 can be an integrated Schottky N channel MOSFET (metal oxide semiconductor field effect transistor). During a sleep mode when transistor M3 326 is off, for example, the parallel Schottky diode can provide the system current path. For a 2S battery and an approximately 0.25 volt drop across the Schottky diode, for example, the power dissipation on the diode can be approximately 2.5%, and can be in a range of approximately 2.5% to approximately 5% of standby power.

In some embodiments, transistor M4 328 (for example, a much smaller N channel MOSFET) may be used parallel to transistor M3 326. This transistor 328 can be directly controlled using signals, for example, such as sleep signals (or standby signals) SLP_S0 # and SLP_S3 #, the AND gate 362, and/or the inverter 372 as illustrated in FIG. 3.

In some embodiments, a standard buck controller may be used as voltage regulator 310. In some embodiments, logic may be included in the buck controller 310 to maintain transistor M2 324 and transistor M3 326 ON during a sleep mode and/or a system standby mode.

In some embodiments, in a sleep mode (and/or system standby mode), transistors 322, 324, and 326 are OFF. For the battery current to flow, transistor 328 may be used to avoid a voltage drop in a diode (for example, a body diode) within transistor 326, for example.

In some embodiments, various alternative approaches may be used in addition to or instead of the circuit and/or system 300. For example, in some embodiments, the peak power support source may be connected in series with the battery to clamp the system voltage (VSYS) during a turbo event. For example, the support voltage source may be connected at a VSYS node which is the charger output. This can help prevent battery ground from lifting above the system ground during a turbo event, and may also add complexity in supporting VR gate drive circuits. For example, in some embodiments, the negative side of battery 112 may be coupled to ground, and the dynamic voltage source (for example, the support VR 110) may be coupled in series with the charger 102 and/the battery 112 (for example, above the charger 102). Similarly, in some embodiments, the negative side of battery 212 may be coupled to ground, and the dynamic voltage source (for example, including regulator 210, transistors 222, 224, and 226, inductor 232, resistors 234 and 236, and/or diode 238) may be coupled in series with the charger 202 and the battery 212 (for example, above the charger 202).

In some embodiments, circuits and/or systems 100, 200 and/or 300 may be included in a battery charger for a system such as a computing system.

Figure 4:
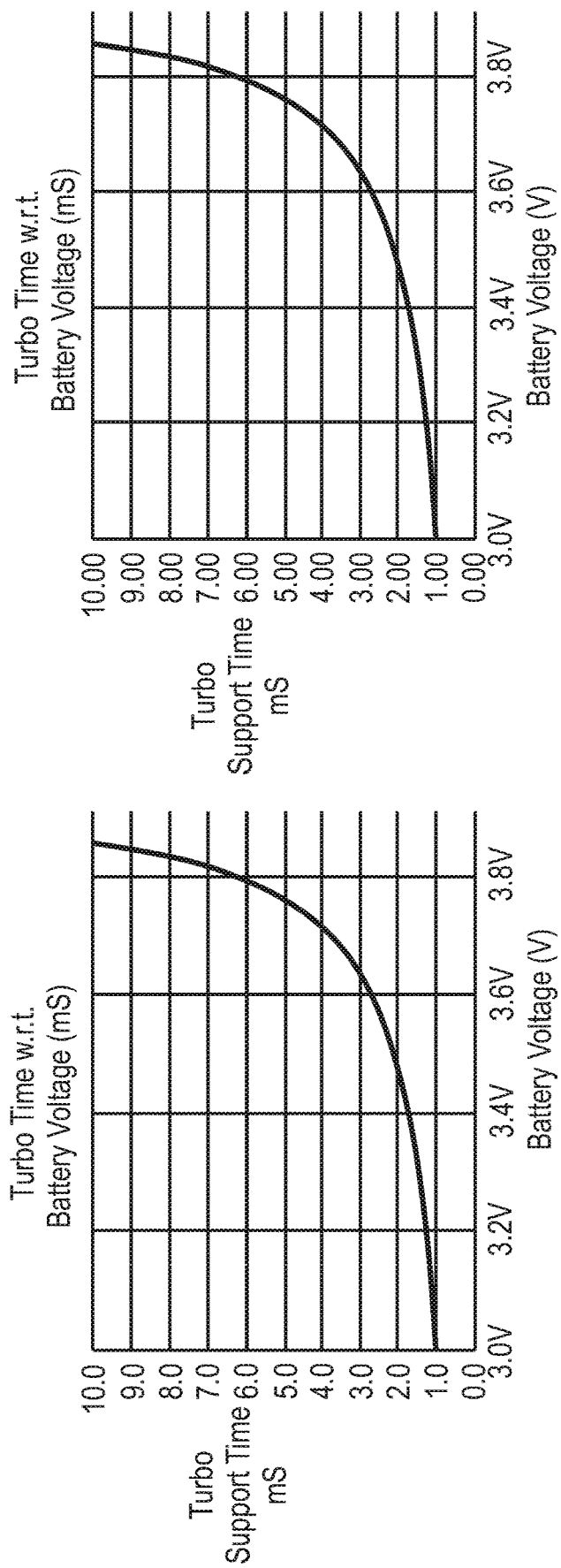
FIG. 4 illustrates a comparison of turbo support time between solutions with different storage capacitances.

FIG. 4 illustrates comparison graphs 400 illustrating a comparison of turbo support time for different turbo support solutions (for example, one or more solutions not described herein or illustrated in any of FIG. 1, FIG. 2, and/or FIG. 3 versus one or more solution described herein or illustrated in any of FIG. 1, FIG. 2, and/or FIG. 3). For example, FIG. 4 illustrates a comparison of turbo support time between solutions with different storage capacitances.

The left side graph of FIG. 4 illustrates use of energy in the system capacitors during a PL4 event, for example. The right side graph of FIG. 4 illustrates a solution in accordance with some embodiments (for example, a solution in which a dynamic voltage source is provided in series with the battery to clamp the system voltage, or VSYS, from going below the minimum system voltage, or VCLAMP). For example, the right side graph of FIG. 4 can illustrate a solution such as one or more embodiments illustrated and/or described herein (for example, one or more embodiments illustrated in FIG. 1, FIG. 2, and/or FIG. 3, and/or described in reference thereto). Similarly, the left side graph of FIG. 4 can illustrate a solution that does not use one or more embodiments illustrated and/or described herein (for example, does not use one or more embodiments illustrated in FIG. 1, FIG. 2, and/or FIG. 3, and/or described in reference thereto), where the solution of the left side graph of FIG. 4 uses twice (or more) the total capacitance than the solution of the right side graph of FIG. 4, for example.

A necessary storage capacitance may be reduced in half (or less than half) with a conservative efficiency of 85%, for example, in accordance with some embodiments. As illustrated in FIG. 4, the turbo support time at different battery voltages (for example, at different battery state of charge) may be used to provide identical turbo support in the solution illustrated in the right graph of FIG. 4 using half the total storage capacitance (or less than half the total storage capacitance) than the total storage capacitance necessary for the solution illustrated by the left graph in FIG. 4, for example.

Figure 5:
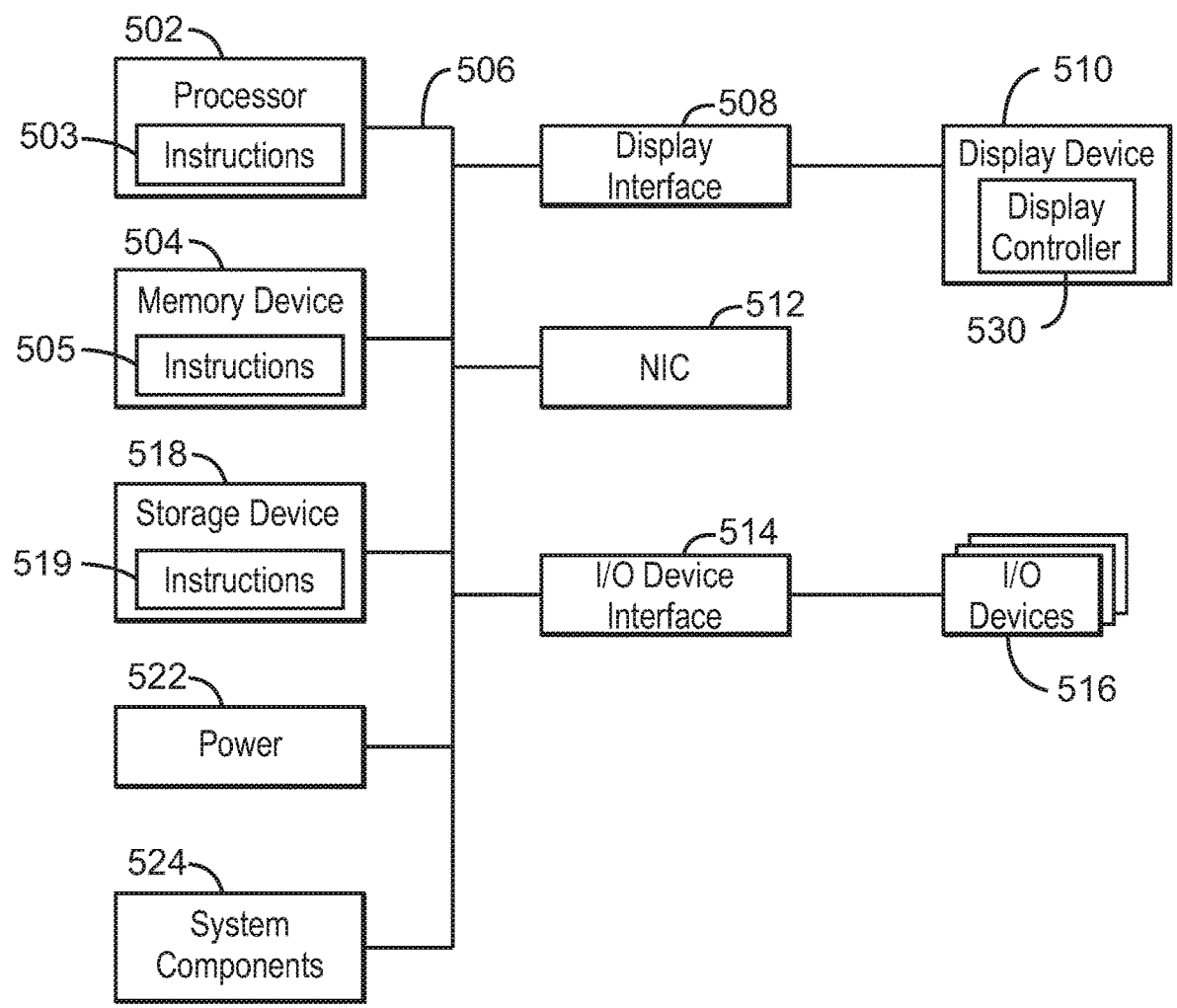
FIG. 5 illustrates a computing device in accordance with some embodiments.

FIG. 5 is a block diagram of an example of a computing device 500 in accordance with some embodiments. In some embodiments, computing device 500 may be a computing device including one or more elements of system 100, system 200, and/or system 300. For example, in some embodiments, computing device 500 can implement any of the techniques illustrated and/or described herein.

In some embodiments, functions of computing device 500 can include, for example, turbo power support for systems with limited battery power. In some embodiments, any portion of the flow, circuits, devices or systems illustrated in any one or more of the figures, and any of the embodiments illustrated and/or described herein can be included in or be implemented by computing device 500. The computing device 500 may be, for example, a computing device, a controller, a control unit, an application specific controller, and/or an embedded controller, among others. In some embodiments, computing device 500 may be a mobile computing device. In some embodiments, computing device 500 may include, for example, a battery, a capacitor bank, a charger for charging, a support voltage regulator, and/or a buck controller as described and/or illustrated herein. In some embodiments, for example, computing device 500 may be the same as and/or include elements from one or more of system 100, system 200, and/or system 300.

The computing device 500 may include a processor 502 that is adapted to execute stored instructions (for example, instructions 503), as well as a memory device 504 (or storage 504) that stores instructions 505 that are executable by the processor 502. The processor 502 can be a single core processor, a multi-core processor, a computing cluster, or any number of other configurations. For example, processor 502 can be an Intel® processor such as an Intel® Celeron, Pentium, Core, Core i3, Core i5, or Core i7 processor. In some embodiments, processor 502 can be an Intel® x86 based processor. In some embodiments, processor 502 can be an ARM based processor. The memory device 504 can be a memory device or a storage device, and can include volatile storage, non-volatile storage, random access memory, read only memory, flash memory, or any other suitable memory or storage systems. The instructions that are executed by the processor 502 may also be used to implement turbo power support for systems with limited battery power, etc. as illustrated and/or described in this specification. In some embodiments, processor 502 may include the same or similar features or functionality as, for example, various controllers or agents in this disclosure.

The processor 502 may also be linked through the system interconnect 506 (e.g., PCI®, PCI-Express®, NuBus, etc.) to a display interface 508 adapted to connect the computing device 500 to a display device 510. The display device 510 may include a display controller 530. Display device 510 may also include a display screen that is a built-in component of the computing device 500. The display device may also include a computer monitor, television, or projector, among others, that is externally connected to the computing device 500. In some embodiments, computing device 500 does not include a display interface or a display device.

In some embodiments, the display interface 508 can include any suitable graphics processing unit, transmitter, port, physical interconnect, and the like. In some examples, the display interface 508 can implement any suitable protocol for transmitting data to the display device 510. For example, the display interface 508 can transmit data using a high-definition multimedia interface (HDMI) protocol, a DisplayPort protocol, or some other protocol or communication link, and the like In addition, a network interface controller (also referred to herein as a NIC) 512 may be adapted to connect the computing device 500 through the system interconnect 506 to a network (not depicted). The network (not depicted) may be a cellular network, a radio network, a wide area network (WAN), a local area network (LAN), or the Internet, among others.

The processor 502 may be connected through system interconnect 506 to an input/output (I/O) device interface 514 adapted to connect the computing host device 500 to one or more I/O devices 516. The I/O devices 516 may include, for example, a keyboard or a pointing device, where the pointing device may include a touchpad or a touchscreen, among others. The I/O devices 516 may be built-in components of the computing device 500, or may be devices that are externally connected to the computing device 500.

In some embodiments, the processor 502 may also be linked through the system interconnect 506 to a storage device 518 that can include a hard drive, a solid-state drive (SSD), a magnetic drive, an optical drive, a USB flash drive, an array of drives, or any other type of storage, including combinations thereof. In some embodiments, the storage device 518 can include any suitable applications that can be used by processor 502 to implement any of the techniques illustrated and/or described herein. In some embodiments, storage 518 stores instructions 519 that are executable by the processor 502. In some embodiments, the storage device 518 can include a basic input/output system (BIOS).

In some embodiments, a power device 522 is provided. For example, in some embodiments, power device 522 can provide any of the functionality illustrated and/or described herein. In some embodiments, any or all elements of one or more of system 100, system 200, and/or system 300 may be included in power device 522. In some embodiments, for example, power device 522 can implement battery charging and/or turbo power support for systems with limited battery power. In some embodiments, any portion of the flow, circuits, devices or systems illustrated in any one or more of the figures, and any of the embodiments illustrated and/or described herein can be included in or be implemented by power device 522. In some embodiments, power device 522 may include a battery, a charger for charging the battery, and a controller to control power provision to the charger and/or battery as described and/or illustrated herein.

In some embodiments, power 522 can include one or more sources of power supply such as one or more power supply units (PSUs). In some embodiments, power 522 can be a part of system 500, and in some embodiments, power 522 can be external to the rest of system 500. In some embodiments, power 522 can provide any other techniques such as those illustrated and/or described herein. For example, in some embodiments, power 522 can provide any of the techniques as described in reference to or illustrated in any of the drawings herein.

FIG. 5 also illustrates system components 524. In some embodiments, system components 524 can include any of display, camera, audio, storage, modem, or memory components, or any additional system components. In some embodiments, system components 524 can include any system components for which power, voltage, power management, turbo power support, etc. can be implemented according to some embodiments as illustrated and/or described herein. In some embodiments, any one or more of system components 524 can implement any of the techniques illustrated and/or described herein, and can include any of the elements and/or system illustrated and/or described herein.

It is to be understood that the block diagram of FIG. 5 is not intended to indicate that the computing device 500 is to include all of the components shown in FIG. 5 in all embodiments. Rather, the computing device 500 can include fewer or additional components not illustrated in FIG. 4 (e.g., additional memory components, embedded controllers, additional modules, additional network interfaces, etc.). Furthermore, any of the functionalities of power device 522 may be partially, or entirely, implemented in hardware or in a processor such as processor 502. For example, the functionality may be implemented with an application specific integrated circuit, logic implemented in an embedded controller, or in logic implemented in the processor 502, among others. In some embodiments, the functionalities of power device 522 can be implemented with logic, wherein the logic, as referred to herein, can include any suitable hardware (e.g., a processor, among others), software (e.g., an application, among others), firmware, or any suitable combination of hardware, software, or firmware. In some embodiments, power device 522 can be implemented with an integrated circuit.

Figure 6:
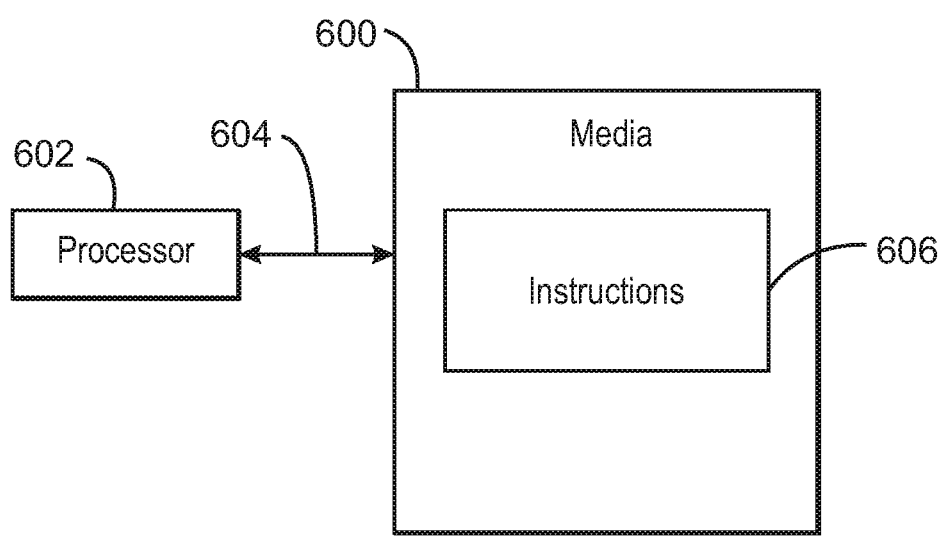
FIG. 6 illustrates one or more processor and one or more computer readable media storing instructions in accordance with some embodiments.

FIG. 6 is a block diagram of an example of one or more processors 602 and one or more tangible, non-transitory computer readable media 600 for implementing any of the techniques described and/or illustrated herein (for example, one or more of battery charging and/or turbo power support, etc.

The one or more tangible, non-transitory, computer-readable media 600 may be accessed by the processor(s) 602 over a computer interconnect 604. Furthermore, the one or more tangible, non-transitory, computer-readable media 600 may include instructions (or code) 606 to direct the processor(s) 602 to perform operations as illustrated and/or described herein. In some embodiments, processor 602 is one or more processors. In some embodiments, processor(s) 602 can perform some or all of the same or similar functions that can be performed by other elements illustrated and/or described herein using instructions (code) 606 included on media 600 (for example, some or all of the functions or techniques illustrated in and/or described in reference to any of FIGS. 1-4). In some embodiments, one or more of processor(s) 602 may include the same or similar features or functionality as, for example, various controllers, units, or agents, etc. illustrated and/or described in this disclosure. In some embodiments, one or more processor(s) 602, interconnect 604, and/or media 600 may be included in computing device 500.

Various components discussed in this specification may be implemented using software components. These software components may be stored on the one or more tangible, non-transitory, computer-readable media 600, as indicated in FIG. 6. For example, turbo power support instructions included in instructions 606 may be adapted to direct the processor(s) 602 to perform one or more of any of the operations described in this specification and/or in reference to the drawings.

It is to be understood that any suitable number of software components may be included within the one or more tangible, non-transitory computer-readable media 600. Furthermore, any number of additional software components shown or not shown in FIG. 6 may be included within the one or more tangible, non-transitory, computer-readable media 600, depending on the specific application.

The various techniques and/or operations described herein (for example, in reference to any one or more of FIGS. 1-4) may be performed by a control unit comprised of one or more processors, monitoring logic, control logic, software, firmware, agents, controllers, logical software agents, system agents, and/or other modules. For example, in some embodiments, some or all of the techniques and/or operations illustrated and/or described herein may be implemented by a system agent. Due to the variety of modules and their configurations that may be used to perform these functions, and their distribution through the system and/or in a different system, they are not all specifically illustrated in their possible locations in the figures.

Reference in the specification to "one embodiment" or "an embodiment" or "some embodiments" of the disclosed subject matter means that a particular feature, structure, or characteristic described in connection with the embodiment is included in at least one embodiment of the disclosed subject matter. Thus, the phrase "in one embodiment" or "in some embodiments" may appear in various places throughout the specification, but the phrase may not necessarily refer to the same embodiment or embodiments.

Example 1 In some examples, an apparatus includes a battery and a dynamic voltage source coupled in series with the battery. The dynamic voltage source is to maintain (and/or clamp) a system voltage from going below a minimum system voltage.

Example 2 includes the subject matter of any other example. The dynamic voltage source is to help implement turbo power support for short durations.

Example 3 includes the subject matter of any other example. The dynamic voltage source is to help prevent system performance from dropping while the state of charge of the battery is low or for designs with battery peak power limitations.

Example 4 includes the subject matter of any other example. The dynamic voltage source is a voltage regulator and/or includes a voltage regulator.

Example 5 includes the subject matter of any other example. The dynamic voltage source is a buck converter and/or includes a buck converter.

Example 6 includes the subject matter of any other example. The dynamic voltage source is to increase an output voltage when a voltage of the battery drops to a predetermined voltage.

Example 7 includes the subject matter of any other example. One or more capacitors are included in the apparatus, and the dynamic voltage source is to use energy of the one or more capacitors to maintain the system voltage above the minimum system voltage.

Example 8 includes the subject matter of any other example. The apparatus includes one or more back light boost to charge the one or more capacitors.

Example 9 includes the subject matter of any other example. The apparatus includes one or more back light boost, and an output of the back light boost is coupled to an input of the dynamic voltage source.

Example 10 includes the subject matter of any other example. In some examples, the dynamic voltage source is enabled when a display is on. In some examples, the dynamic voltage source is enabled when a display is off. In some examples, the dynamic voltage source is enabled when a display is on or is off.

Example 11 includes the subject matter of any other example. The dynamic voltage source is to maintain the system voltage above the minimum system voltage during a turbo event.

Example 12 includes the subject matter of any other example. The apparatus includes a transistor to bypass the dynamic voltage source during a normal operation.

Example 13 includes the subject matter of any other example. The dynamic voltage source is a step down controller and/or includes a step down controller.

Example 14 includes the subject matter of any other example. The apparatus is a step down controller and/or includes a step down controller. The step down controller is configured to a continuous conduction mode (CCM).

Example 15 includes the subject matter of any other example. The dynamic voltage source clamps the system voltage for turbo support, and/or peak system current is supported by the battery in series with the dynamic voltage source.

Example 16 In some examples, a method includes maintaining a system voltage from going below a minimum system voltage using a dynamic voltage source coupled in series with a battery.

Example 17 includes the subject matter of any other example. The method includes using the dynamic voltage source to help implement turbo power support for short durations.

Example 18 includes the subject matter of any other example. The method includes using the dynamic voltage source to help prevent system performance from dropping while the state of charge of the battery is low or for designs with battery peak power limitations.

Example 19 includes the subject matter of any other example. The dynamic voltage source is a voltage regulator and/or includes a voltage regulator.

Example 20 includes the subject matter of any other example. The dynamic voltage source is a buck converter and/or includes a buck converter.

Example 21 includes the subject matter of any other example. The method includes using the dynamic voltage source to increase an output voltage when a voltage of the battery drops to a predetermined voltage.

Example 22 includes the subject matter of any other example. The method includes using the dynamic voltage source to use energy of one or more capacitors to maintain the system voltage above the minimum system voltage.

Example 23 includes the subject matter of any other example. The method includes charging the one or more capacitors (for example, using a back light boost).

Example 24 includes the subject matter of any other example. The method includes coupling the back light boost to the dynamic voltage source.

Example 25 includes the subject matter of any other example. In some examples, the dynamic voltage source is enabled when a display is on. In some examples, the dynamic voltage source is enabled when a display is off. In some examples, the dynamic voltage source is enabled when a display is on or is off.

Example 26 includes the subject matter of any other example. The method includes using the dynamic voltage source to maintain the system voltage above the minimum system voltage during a turbo event.

Example 27 includes the subject matter of any other example. The method includes bypassing the dynamic voltage source during a normal operation.

Example 28 includes the subject matter of any other example. The dynamic voltage source is a step down controller and/or includes a step down controller.

Example 29 includes the subject matter of any other example. The step down controller is configured to a continuous conduction mode (CCM).

Example 30 includes the subject matter of any other example. The method includes clamping the system voltage for turbo support, and/or supporting a peak system current using the battery in series with the dynamic voltage source.

Example 31 In some examples, an apparatus include means for maintaining a system voltage from going below a minimum system voltage, the means for maintaining coupled in series with a battery. In some versions of example 31, the means for maintaining is a dynamic voltage source and/or includes a dynamic voltage source.

Example 32 includes the subject matter of any other example. The apparatus includes means for implementing turbo power support for short durations.

Example 33 includes the subject matter of any other example. The apparatus includes means for preventing system performance from dropping while the state of charge of the battery is low, and/or for designs with battery peak power limitations.

Example 34 includes the subject matter of any other example. The means for maintaining is a voltage regulator and/or includes a voltage regulator.

Example 35 includes the subject matter of any other example. The means for maintaining is a buck converter and/or includes a buck converter.

Example 36 includes the subject matter of any other example. The apparatus includes means for increasing an output voltage when a voltage of the battery drops to a predetermined voltage.

Example 37 includes the subject matter of any other example. The apparatus includes means for using energy of one or more capacitors to maintain the system voltage above the minimum system voltage.

Example 38 includes the subject matter of any other example. The apparatus includes means for charging one or more capacitors (for example, using a back light boost).

Example 39 includes the subject matter of any other example. The apparatus includes means for coupling a back light boost to the means for maintaining.

Example 40 includes the subject matter of any other example. In some examples, the apparatus includes means for enabling the means for maintaining when a display is on. In some examples, the apparatus includes means for enabling the means for maintaining when a display is off. In some examples, the apparatus includes means for enabling the means for maintaining when a display is on or is off.

Example 41 includes the subject matter of any other example. The apparatus includes means for maintaining the system voltage above the minimum system voltage during a turbo event.

Example 42 includes the subject matter of any other example. The apparatus includes means for bypassing the means for maintaining during a normal operation.

Example 43 includes the subject matter of any other example. The means for maintaining is a step down controller and/or includes a step down controller.

Example 44 includes the subject matter of any other example. The step down controller is configured to a continuous conduction mode (CCM).

Example 45 includes the subject matter of any other example. The apparatus includes means for clamping the system voltage for turbo support, and/or includes supporting a peak system current using the battery in series with the means for maintaining.

Example 46 In some examples, a system includes a battery, a battery charger, and a dynamic voltage source coupled in series with the battery and with the battery charger. The dynamic voltage source is to maintain a system voltage from going below a minimum system voltage.

Example 47 includes the subject matter of any other example. The dynamic voltage source is to help implement turbo power support for short durations.

Example 48 includes the subject matter of any other example. The dynamic voltage source is to help prevent system performance from dropping while the state of charge of the battery is low, and/or for designs with battery peak power limitations.

Example 49 includes the subject matter of any other example. The dynamic voltage source is a voltage regulator and/or includes a voltage regulator.

Example 50 includes the subject matter of any other example. The dynamic voltage source is a buck converter and/or includes a buck converter.

Example 51 includes the subject matter of any other example. The dynamic voltage source is to increase an output voltage when a voltage of the battery drops to a predetermined voltage.

Example 52 includes the subject matter of any other example. The system includes one or more capacitors. The dynamic voltage source is to use energy of the one or more capacitors to maintain the system voltage above the minimum system voltage.

Example 53 includes the subject matter of any other example. The system includes a back light boost to charge one or more capacitors (and/or the one or more capacitors of any other example).

Example 54 includes the subject matter of any other example. An output of the back light boost is coupled to an input of the dynamic voltage source.

Example 55 includes the subject matter of any other example. In some examples, the dynamic voltage source is enabled when a display is on. In some examples, the dynamic voltage source is enabled when a display is off. In some examples, the dynamic voltage source is enabled when a display is on or is off.

Example 56 includes the subject matter of any other example. The dynamic voltage source is to maintain the system voltage above the minimum system voltage during a turbo event.

Example 57 includes the subject matter of any other example. The system includes a transistor to bypass the dynamic voltage source during a normal operation.

Example 58 includes the subject matter of any other example. The dynamic voltage source is a step down controller and/or includes a step down controller.

Example 59 includes the subject matter of any other example. The step down controller is configured to a continuous conduction mode (CCM).

Example 60 includes the subject matter of any other example. The dynamic voltage source clamps the system voltage for turbo support, and/or a peak system current is supported by the battery in series with the dynamic voltage source.

Example 61 In some examples, machine-readable storage includes machine-readable instructions, when executed, to implement a method or realize an apparatus as in any other example.

Example 62 In some examples, one or more machine readable medium include(s) code, when executed, to cause a machine to perform the method of any other example.

Example 63 In some examples, an apparatus includes means to perform a method as in any other example.

Example 64 In some examples, an apparatus includes a control unit. The apparatus includes means to perform a method as in any other example.

Example 65 In some examples, one or more tangible, non-transitory machine readable media include(s) a plurality of instructions that, in response to being executed on at least one processor, cause the at least one processor to implement a method or realize an apparatus as in any other example.

Although example embodiments and examples of the disclosed subject matter are described with reference to circuit diagrams, flow diagrams, block diagrams etc. in the drawings, persons of ordinary skill in the art will readily appreciate that many other ways of implementing the disclosed subject matter may alternatively be used. For example, the arrangements of the elements in the diagrams, or the order of execution of the blocks in the diagrams may be changed, or some of the circuit elements in circuit diagrams, and blocks in block/flow diagrams described may be changed, eliminated, or combined. Any elements as illustrated or described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, one or more volatile or non-volatile memory devices, such as storage devices or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile or non-volatile memory readable by the processor, at least one input device or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, or in a distributed environment, and with program code stored locally or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter. For example, in each illustrated embodiment and each described embodiment, it is to be understood that the diagrams of the figures and the description herein is not intended to indicate that the illustrated or described devices include all of the components shown in a particular figure or described in reference to a particular figure. In addition, each element may be implemented with logic, wherein the logic, as referred to herein, can include any suitable hardware (e.g., a processor, among others), software (e.g., an application, among others), firmware, or any suitable combination of hardware, software, and firmware, for example.

What is claimed is:

1. An apparatus comprising:
    a battery;
    a dynamic voltage source coupled in series with the battery, the dynamic voltage source comprising a voltage regulator that includes a buck controller;
    a capacitor bank coupled to the buck controller and including one or more capacitors, wherein the dynamic voltage source is to use energy of the one or more capacitors to maintain a system voltage above a minimum system voltage; and
    a back light boost coupled to the buck controller and the capacitor bank via a resistor, the back light boost to charge the one or more capacitors of the capacitor bank.

2. The apparatus of claim 1, the dynamic voltage source to help implement turbo power support for short durations.

3. The apparatus of claim 1, the dynamic voltage source to help prevent system performance from dropping while a state of charge of the battery is low or for designs with battery peak power limitations.

4. The apparatus of claim 1, wherein the dynamic voltage source is to increase an output voltage when a voltage of the battery drops to a predetermined voltage.

5. The apparatus of claim 1, wherein an output of the back light boost is coupled to an input of the dynamic voltage source.

6. The apparatus of claim 1, wherein the dynamic voltage source is enabled when a display is on, or the dynamic voltage source is enabled when a display is off.

7. The apparatus of claim 1, the dynamic voltage source to maintain the system voltage above the minimum system voltage during a turbo event.

8. The apparatus of claim 1, comprising a transistor to bypass the dynamic voltage source during a normal operation.

9. The apparatus of claim 1, wherein the dynamic voltage source comprises a step down controller.

10. The apparatus of claim 9, wherein the step down controller is configured to a continuous conduction mode.

11. The apparatus of claim 1, wherein the dynamic voltage source clamps the system voltage for turbo support, and wherein a peak system current is supported by the battery in series with the dynamic voltage source.

12. A system comprising:
a battery;
a battery charger;
a dynamic voltage source coupled in series with the battery and with the battery charger, the dynamic voltage source comprising a voltage regulator that includes a buck controller;
a capacitor bank coupled to the buck controller and including one or more capacitors, wherein the dynamic voltage source is to use energy of the one or more capacitors to maintain the system voltage above a minimum system voltage; and
a back light boost coupled to the buck controller and the capacitor bank via a resistor, the back light boost to charge the one or more capacitors of the capacitor bank.

13. The system of claim 12, the dynamic voltage source to maintain the system voltage above the minimum system voltage during a turbo event.

* * * * *